(12) United States Patent
Lambert et al.

(10) Patent No.: US 10,330,257 B2
(45) Date of Patent: Jun. 25, 2019

(54) LIQUID CONTAINMENT DEVICE AND CONTAINMENT OF LEAKAGE FROM A LIQUID RESERVOIR

(71) Applicant: SÉCURIBAC INC., Montreal (CA)

(72) Inventors: Jacques Lambert, Montreal (CA); Claude Mauffette, Montreal (CA); Pierre Halmai, Montreal (CA)

(73) Assignee: SÉCURIBAC INC., Montreal, QC (CA)

( * ) Notice: Subject to any disclaimer, the term of this patent is extended or adjusted under 35 U.S.C. 154(b) by 117 days.

(21) Appl. No.: 15/258,030

(22) Filed: Sep. 7, 2016

(65) Prior Publication Data

US 2017/0067598 A1    Mar. 9, 2017

Related U.S. Application Data

(60) Provisional application No. 62/215,385, filed on Sep. 8, 2015.

(51) Int. Cl.
| | |
|---|---|
| *F16N 31/00* | (2006.01) |
| *B65D 21/08* | (2006.01) |
| *F24H 9/16* | (2006.01) |
| *F16N 31/02* | (2006.01) |

(52) U.S. Cl.
CPC ......... *F16N 31/002* (2013.01); *B65D 21/086* (2013.01); *F24H 9/165* (2013.01); *F16N 31/006* (2013.01); *F16N 31/02* (2013.01); *F16N 2031/008* (2013.01)

(58) Field of Classification Search
CPC .... F16N 31/002; F16N 31/004; F16N 31/006; F16N 31/02; F16N 2031/008; F24H 9/165; B65D 21/08; B65D 11/1893; B65D 21/086
USPC .......................... 220/669–675, 571, 265–280
See application file for complete search history.

(56) References Cited

U.S. PATENT DOCUMENTS

| | | | | |
|---|---|---|---|---|
| 2,299,091 | A | * | 10/1942 | Hothersall ............. B65D 25/06 220/265 |
| 2,924,841 | A | | 2/1960 | Seibert |
| 2,997,927 | A | | 8/1961 | Carson |
| 3,792,809 | A | | 2/1974 | Schneider |
| 4,026,458 | A | | 5/1977 | Morris et al. |
| 4,201,307 | A | | 5/1980 | Malloy |
| 4,381,278 | A | | 4/1983 | Ingraffea |
| 4,809,390 | A | | 3/1989 | Jackson et al. |
| 4,944,253 | A | | 7/1990 | Bellofatto |

(Continued)

*Primary Examiner* — Andrew D Perreault
(74) *Attorney, Agent, or Firm* — Anglehart et al.

(57) ABSTRACT

A liquid containment device and method for containing leakage from a liquid reservoir. The liquid containment device comprises a base and a peripheral wall that comprises flexible resilient folds that allow a portion of the peripheral wall to be flattened against the floor to slide the liquid containment device under the liquid reservoir. The peripheral wall is resilient and returns readily to a position where it extends upwardly from the base when released. The liquid containment device can be installed by lifting slightly a reservoir, flattening a portion of the peripheral wall, sliding it under the reservoir until the flattened portion protrudes past the far edge of the reservoir whereupon it resiliently regains its shape forming a receptacle under the reservoir. Abstract not to be interpreted as limiting.

18 Claims, 7 Drawing Sheets

(56) References Cited

U.S. PATENT DOCUMENTS

| | | | |
|---|---|---|---|
| 5,161,690 A * | 11/1992 | Foshaug | B65D 19/02 |
| | | | 206/512 |
| 5,503,294 A * | 4/1996 | Taylor | B65D 1/22 |
| | | | 220/558 |
| 5,645,103 A | 7/1997 | Whittaker | |
| 5,878,945 A | 3/1999 | Weder | |
| 6,116,165 A | 9/2000 | Kadesky | |
| 6,155,479 A | 12/2000 | Wellner et al. | |
| 6,718,788 B1 | 4/2004 | Shuck | |
| 6,830,769 B2 | 12/2004 | Meroni | |
| 7,114,514 B2 | 10/2006 | Houle | |
| 7,168,588 B2 | 1/2007 | Van Romer | |
| 7,523,854 B2 | 4/2009 | Gray | |
| 7,559,430 B2 | 7/2009 | D'Olimpio et al. | |
| 7,735,510 B1 | 6/2010 | Carter | |
| 8,011,568 B2 | 9/2011 | Maeaettae et al. | |
| 9,090,440 B2 | 7/2015 | Lambert et al. | |
| 2006/0213962 A1 | 9/2006 | Anghileri | |
| 2010/0288779 A1 | 11/2010 | Avery et al. | |

\* cited by examiner

LIQUID CONTAINMENT DEVICE AND CONTAINMENT OF LEAKAGE FROM A LIQUID RESERVOIR

RELATED APPLICATIONS

This application claims priority from, U.S. Provisional Patent Application 62/215,385 of the same title filed Sep. 8, 2015, which is incorporated herein by reference.

TECHNICAL FIELD

This invention relates generally to the field of leakage containment from pieces of equipments such as hot water tanks and more specifically to the field of liquid containment devices and technologies for containing leakage using liquid containment devices.

BACKGROUND

Liquid reservoirs such as hot water tanks and like reservoirs typically have a long lifetime measured in years but often fail eventually in a manner that results in the leakage of liquid from within the reservoir. Failures can result from corrosion of the reservoir walls or from failures of the pipe or pipe junctions from conduits leading into or out of the reservoirs. Such reservoirs are often installed within buildings, often inside inhabited buildings, making leaks all the more problematic.

In order to contain potential leaks, fail safe devices have been developed for hot water tanks may be installed that underlie or substantially envelop the bottom portion of a tank. Typically, such fail safe devices need to be installed prior to, or along with, installation of a new hot water tank. In other cases where the fail safe device can be provided on an existing installed hot water tank, the installation of the fail safe device is typically difficult and potentially costly.

U.S. Pat. No. 9,090,440 details a method for installing a fluid containment device under a reservoir which provided a simplified installation method, a fluid containment device and a two-part tool for installing the fluid containment device, e.g. according to the simplified installation method. In particular, the two part tool comprises a wedge component which can be inserted between a wall and a reservoir at the top end and a jack component which is used to lift the reservoir while the wedge component keeps the reservoir substantially vertical. While the reservoir is lifted, the fluid containment device could be slid under the reservoir. In the taught example, the fluid containment device was made up of a circular sheet of flexible yet water-impervious material and was provided with a tightening belt around the periphery for tightening against the hot water tank. This device being flexible, it did not provide strong resilience against deformity which could lead to leaks from within it. The tightening belt employed holes through which water could leak and also may be difficult to lift up to the desired position particularly where the area around the tank is not easily accessible. Installation could be difficult. Moreover the flexible nature of the device does not lend itself well to improvement such as drainage conduits.

U.S. Pat. No. 4,944,253 teaches a water proof sheet having three extending flaps that is slid underneath a water heater. The flaps are attached by tape or other means to the lower sides of the water heater. In this case, installation is even more difficult, and in the discussed embodiment the resulting device is taped to the tank.

There is a need in the art for an improved liquid containment device and method containing leakage from a liquid reservoir and method of installing a liquid containment device.

SUMMARY

In accordance with a non-limiting embodiment is provided a liquid containment device capturing leakage from a liquid reservoir, the liquid containment device being at least partly flatennable and slideable under the liquid reservoir. The liquid containment device comprises a base having an outer periphery and extending continuously within the outer periphery to define a continuous upper surface for supporting the liquid reservoir and a lower surface for facing a floor. The liquid containment device comprises a mechanically biased foldable peripheral wall extending at rest upwardly above the upper surface towards an upper end from the base at the outer periphery and surrounding the base about the outer periphery to define an interior volume, the peripheral wall having at least one curved portion for surrounding at least part of the liquid reservoir, the peripheral wall comprising in the at least one curved portion at least one corrugated portion each comprising a plurality of tapered resilient flexible folds widening from the outer periphery towards the upper end to be unfoldable to expand the curved portion to allow the flattening of at least one side of the peripheral wall such that the liquid containment device can be slid through a gap between the liquid reservoir and the floor, the plurality of tapered flexible folds having a resilience creating a mechanical bias causing the resilient flexible folds to return to a folded position wherein the at least one side extends upwardly when the at least one side is slid past the liquid reservoir.

In accordance with another non-limiting embodiment is provided a method for containing leakage from a liquid reservoir. The method comprises providing a liquid containment device having a base dimensioned to receive a lower end of the liquid reservoir and a mechanically biased foldable peripheral wall surrounding the base and projecting upwards therefrom, whereby the peripheral wall comprises at least one curved portion for surrounding at least part of the liquid reservoir, the peripheral wall comprising at least one expandable portion expandable to allow the flattening of at least one side of the peripheral wall but resiliently biased in a upward extending configuration whereby the at least one side projects upwards at rest from the base. The method further comprises providing a gap between the liquid reservoir and a floor beneath the liquid reservoir, the gap being thicker than both a thickness of the base and a thickness of the at least one side. The method further comprises placing the base on the floor with the at least one side facing a first side the liquid reservoir and flattening the at least one side against the floor. The method further comprises while the at least one side is flattened against the floor, sliding the liquid containment device in the direction of the at least one side through the gap until the at least one side emerges on a second side of the liquid reservoir opposite the first side and allowing the at least one side to return to projecting upwards from the base.

BRIEF DESCRIPTION OF THE DRAWINGS

The invention will be better understood by way of the following detailed description of embodiments of the invention with reference to the appended drawings, in which.

DETAILED DESCRIPTION

Figure 1:
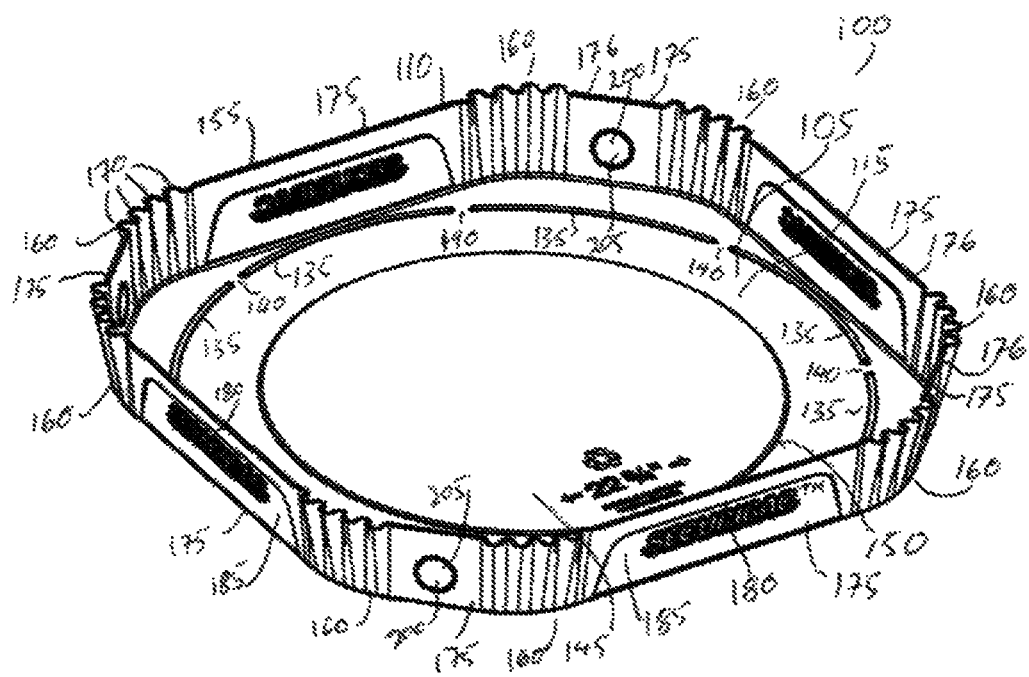
FIG. 1 shows a perspective view of a liquid containment device according to a non-limiting example.
Figure 4:
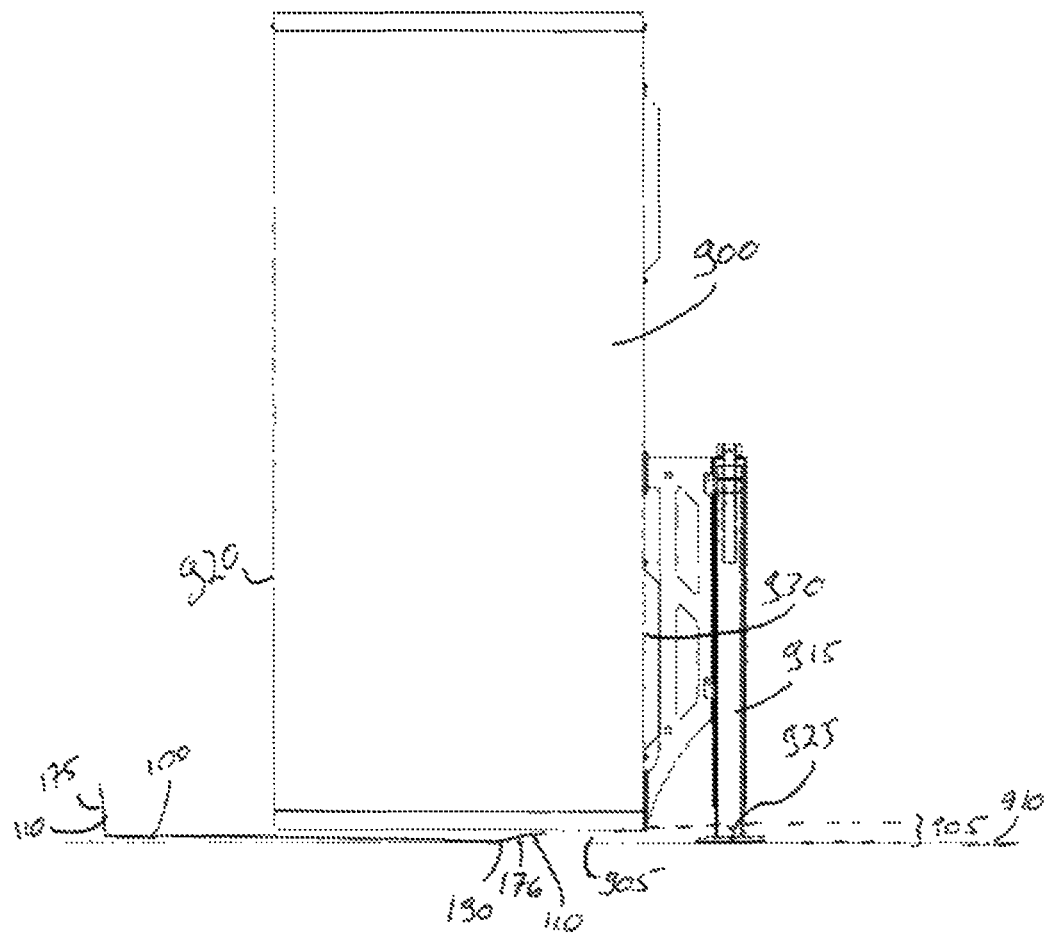
FIG. 4 shows a side cross-sectional view of the liquid containment device of FIG. 1 being installed under a liquid reservoir with one side flattened for sliding under the liquid reservoir.
Figure 5:
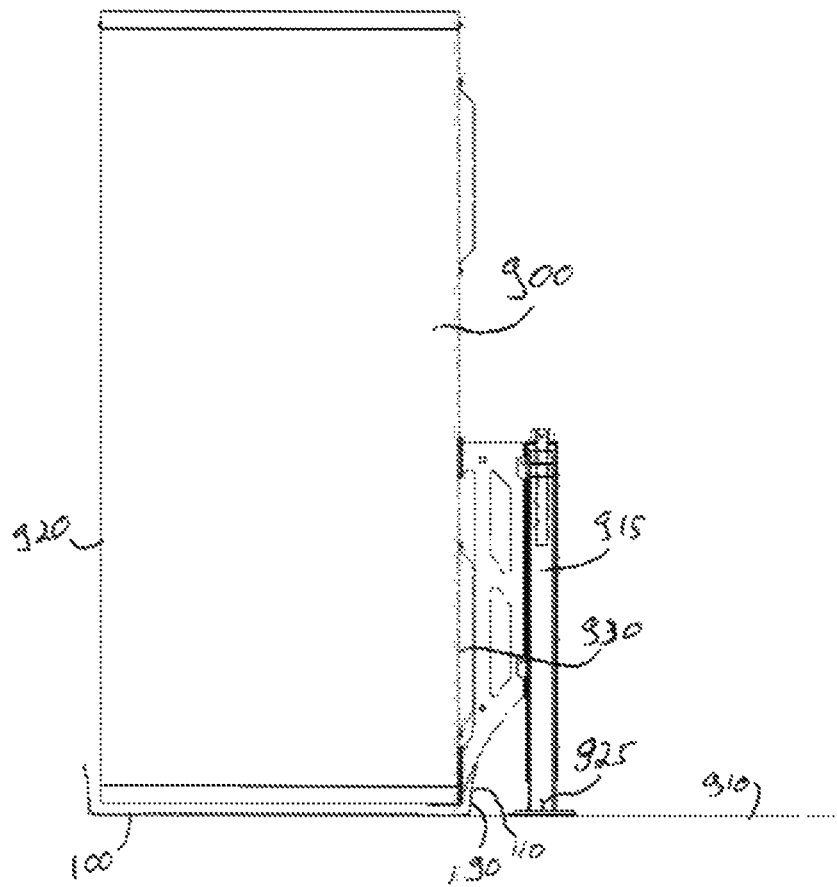
FIG. 5 shows a side cross-sectional view of another the liquid containment device of FIG. 1 being installed under a liquid reservoir with the previously-flattened side sprung back upright.
Figure 6:
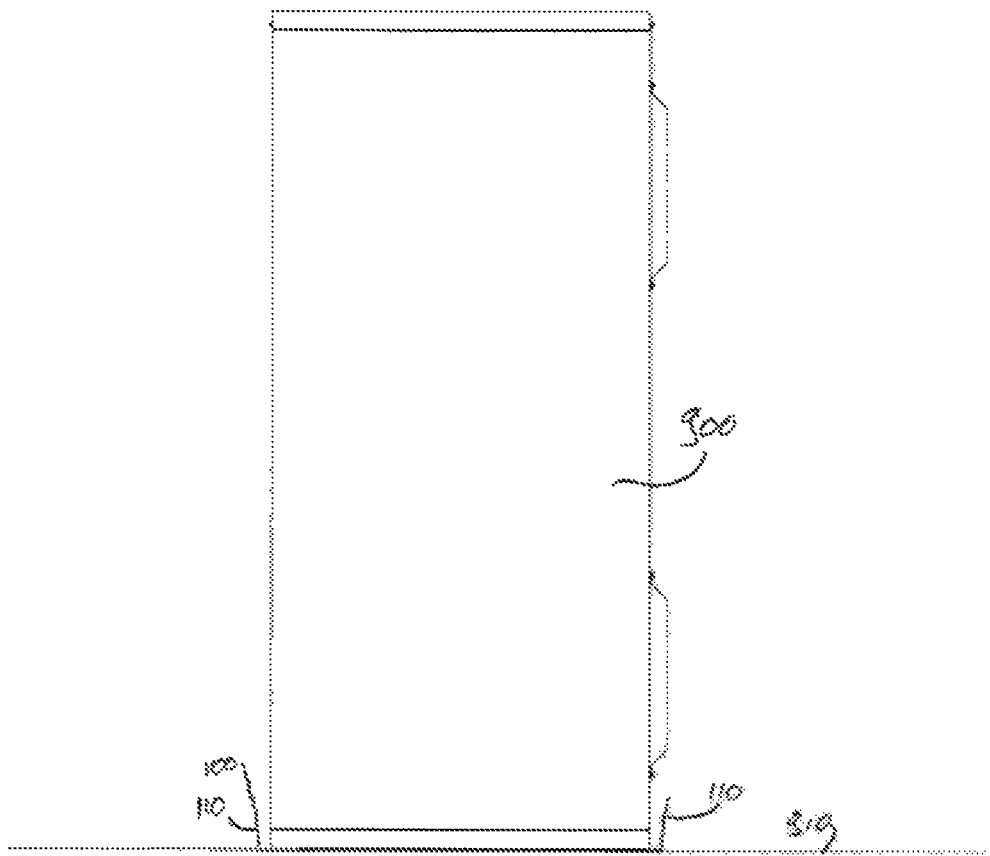
FIG. 6 shows a side cross-sectional view of the liquid containment device of FIG. 1 installed under a liquid reservoir.

FIG. 1 shows a liquid containment device 100 in accordance with a non-limiting embodiment. The liquid containment device 100 comprises a base 105, a peripheral wall 110 which encloses an interior volume 115. The liquid containment device 100 is a device to contain liquids leaked down from a liquid reservoir 900 such as a hot water tank as shown in FIG. 4 to FIG. 6. As shown in FIG. 1, the liquid containment device 100 forms a receptacle for capturing leakage from a liquid reservoir. To this end, the liquid containment device 100 can be installed under a liquid reservoir such that any liquid leaking from the reservoir drips into the liquid containment device 100 and is captured therein.

The base 105 has an outer periphery 120 and it extends continuously within the outer periphery 120 such that there are no holes or other openings within the base 120 through which a liquid, particularly a liquid, in the interior volume 115 could escape. The base 105 is substantially planar such that it can be laid on a flat floor in a generally horizontal position. It is to be understood that the planar base 105 may include indentations, feet or other features and that it may also have a certain curvature. For example, the base 105 may have a slight downward curvature that flattens when the base 105 is lain down on a floor or it may have rising features that do not touch the floor when the base 105 is laid on the floor.

Within the outer periphery 120, the base 105 defines a continuous upper surface 125 for supporting the liquid reservoir 900 and a lower surface 130 for facing the floor. The upper surface 125 and lower surface 130 are on opposite sides of the base 105 and in this example make up the largest faces of the base 105. The upper surface 125 faces a generally upward direction when the base 105 is laid on the floor with the lower surface 130 facing the floor.

The base 105 is dimensioned to receive the liquid reservoir 900, and specifically the upper surface 125 has a shape and size capable of accommodating the footprint of the liquid reservoir 900 such that the entire footprint of the reservoir can overlay the upper surface 125. In the example of FIG. 1, the liquid containment device 100 is intended for a cylindrical hot water tank having a 22" diameter (e.g. a 40 gallon tank) and as such, the upper surface 125 has an area containing a circle of 22" diameter. In an alternate example (not shown), the liquid containment device 100 may be intended for a tank having a 26" diameter (e.g. a 60 gallon tank) and as such the upper surface 125 may have an area containing a circle of 26" diameter.

The upper surface 125 may comprise ridges, lugs, protrusions or other features. For example, the upper surface 125 may include features for helping in the placement of and/or holding in place the liquid reservoir 900 with respect to the liquid containment device 100 (and/or vice versa). In the particular example shown the upper surface 125 comprises a plurality of ridges 135 protruding vertically upward from their neighboring areas of the upper surface 125. The ridges 135 are guiding ridges that provide positional guidance for placement of the liquid containment device 100 relative to the liquid reservoir 900. The ridges 135 may also help hold the liquid containment device 100 in place relative to the liquid reservoir 900. In this particular example, the ridges 135 have the shape of a circle section and are spaced apart by gaps 140 which allow the flow of liquid between the ridges 135. In particular the ridges 135 are disposed around the upper surface 125 so as to form a circle outlining the shape of the lower end of the liquid reservoir 900, in this case a 22" circular shape.

The upper surface 125 may also comprise other feature such as inclinations to direct flow of liquid within the liquid containment device 100. The upper surface 125 comprises a circular projection 145 projecting upwards from its neighborhood on the upper surface 125 and forming a circular ridge 150 around its periphery. The upwards projection may serve the purpose of directing flow of liquid within the liquid containment device 100 away from itself, e.g. towards the walls or towards a liquid conduit, but in this example, the circular projection 145 is provided to provide the circular ridge 150 which confers extra rigidity to the base 105.

As shown in FIG. 1, the upper surface 125 may also comprise additional features such as embossments or other visual features depicting descriptive information and/or instructions.

The lower surface 130 is adapted for facing the floor, and for generally supporting the liquid containment device 100 upon the floor. The lower surface 130 may simply be planar to be laid flat on the floor or may include feet, ridges, troughs and other features. In this particular example, the base 105 has a generally uniform thickness and the features of the upper surface 125 are present in inverse form on the lower surface 130. Thus where the upper surface 125 comprises embossed ridges 135, the lower surface 130 comprises like-shaped depressions corresponding to the ridges. Likewise the circular projection 145 takes the form of a circular depression in the lower surface 130. This is a result of the thermoformed nature of the liquid containment device 100 in this example, however, it will be understood that in accordance with other fabrication methods, the lower surface 130 does not necessarily need to correspond in this way to the upper surface 125. In some embodiments, the lower surface 130 comprises feet upon which the base 105 is supported.

Thus the liquid reservoir 900 may be supported by the liquid containment device 100 by placing it inside and/or on top of the liquid containment device 100. For example, ground-contacting portions of a liquid reservoir 900 that would normally contact the ground and on which the reservoir is supported can be placed on the base 105 to be supported thereby, which can in turn be placed on and supported by the floor.

The interior volume 115 is bounded by the peripheral wall 110 and the base 105. The peripheral wall 110 surrounds the interior volume 115 and the base 105 forms a barrier on one side of the peripheral wall such that together they form a vessel. On the opposite side of the interior volume 115 from the base 105, the interior volume 115 is open to the exterior.

The peripheral wall 110 extends upwardly from the base 105 above the upper surface 125 from the outer periphery 120 to an upper end 155 of the peripheral wall 110. The upper end 155 is the topmost part of the peripheral wall 110 and in this example forms a peripheral boundary of the interior volume 115. The peripheral wall 110 extends generally upwardly from the upper surface 125, in this example at an angle of roughly 5 degrees outwards from an axis normal to the upper surface 125 and/or base 105. The upper end 155 of the peripheral wall 110 is vertically above the upper surface 125 or a plane thereof by a height, which in this example is generally uniform across the peripheral wall 110.

As shown in FIG. 4, the peripheral wall 110 is foldable in that at least a portion of it can be folded downwards and generally flattened to provide a lower profile capable of being slid under the liquid reservoir 900 when there is a gap between the liquid reservoir 900 and the floor that is thinner than the height of the peripheral wall 110. The peripheral wall 100 is mechanically biased to retain the wall in its at rest configuration wherein the peripheral wall 110 extends upwardly from the base 105 as shown in FIG. 1 to FIG. 3 and FIG. 5 to FIG. 8.

The peripheral wall 110 comprises one or more curved portion 160 for surrounding at least part of the liquid reservoir 900. The curved portions 160 make it possible for the peripheral wall 110 to surround the liquid reservoir 900. The peripheral wall 110 comprises a plurality of tapered resilient flexible folds. More particularly, the peripheral wall 110 comprises at least one corrugated portion 165. In this example, each curved portion 160 is made up of a corrugated portion 165. The corrugated portions 165 comprise at least one, but here a plurality of, resilient flexible folds 170. The folds 170 are flexible, allowing them to be unfolded, and comprise excess material allowing the stretching of the peripheral wall 110 when unfolded. However, the folds 170 are resilient and resist deformation, and particularly unfolding such that when forcefully unfolded to stretch the peripheral wall 110, they naturally return to their folded configuration, e.g. shown in FIG. 1, FIG. 2, FIG. 3, and FIG. 7, when the force applied to unfold them is removed.

The folds 170 are tapered such that more material is present in the corrugated portions 165 towards the upper end 155 of the peripheral wall. The perimeter of the peripheral wall 110 is thus greater at the upper end 155 than at an opposed bottom end at the outer periphery of the base 105. In particular, the excess material comprised in the folds 170 is sufficient to allow the flattening of at least one portion of the peripheral wall 110 against the floor when the base 105 is lying on the floor, e.g. when the lower surface 130 of the base 105 is on the floor. This characteristic is shown more detail in the variant illustrated in FIG. 8.

The peripheral wall 110 may also comprise rigid portions 175. In example of FIG. 1, FIG. 2 and FIG. 3, the rigid portions 175 are between corrugated portions 165 and each have a corrugated portion 165 at each of their respective ends. The rigid portions 175 may comprise ridges, lugs, protrusions or other features, and in the particular example shown here, four of the rigid portions 175 comprise a rigidity ridge 180 formed by a depression 185 in the peripheral wall 110 which confer rigidity against deformation, e.g. in a direction transversal to the rigidity ridge. As shown the rigid portions may also include embossing or other visual features identifying the product or otherwise providing promotional information.

Figure 2:
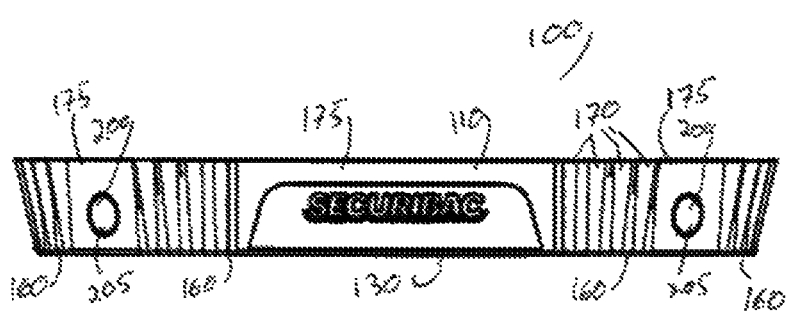
FIG. 2 shows a side elevation view of the liquid containment device of FIG. 1.
Figure 3:
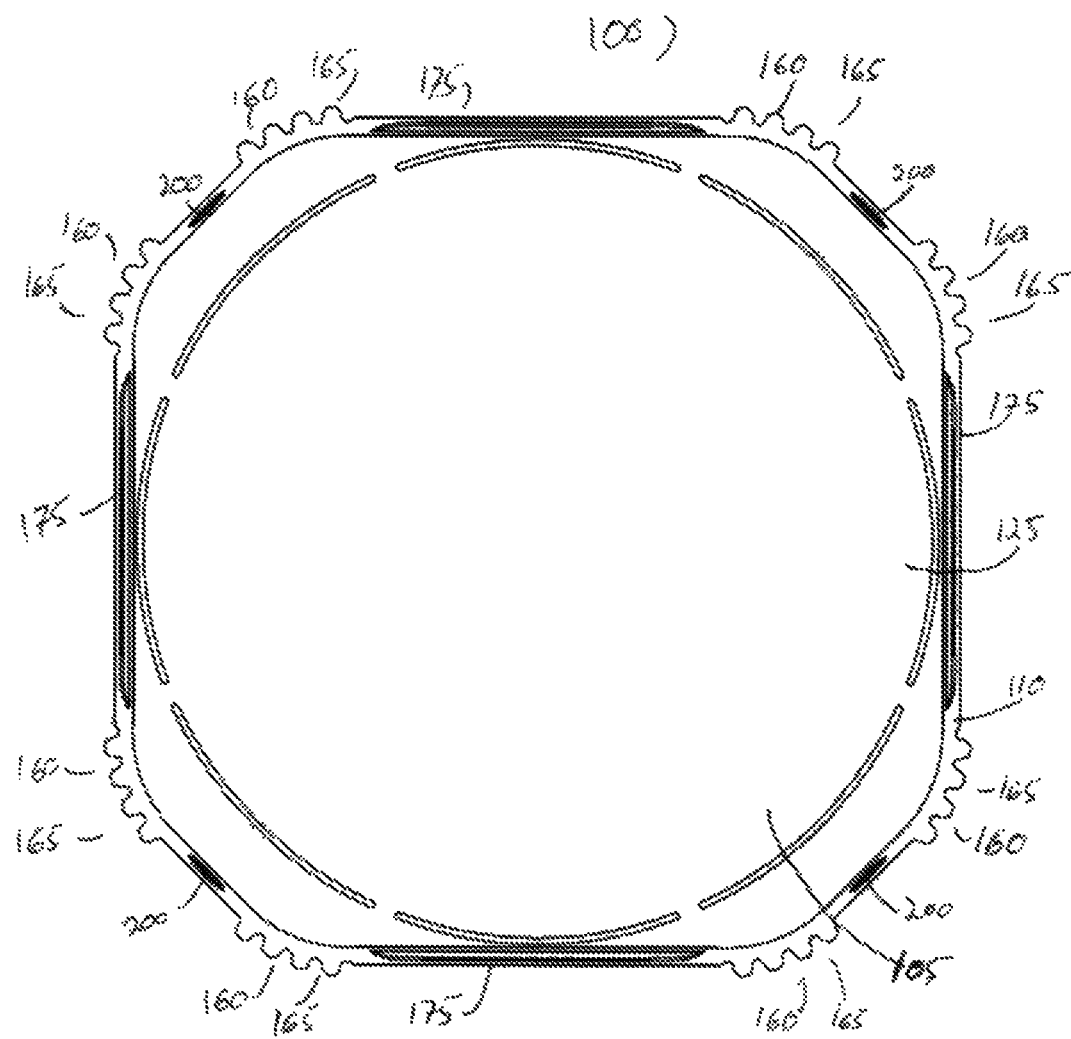
FIG. 3 shows a top plan view of the liquid containment device of FIG. 1.

In the example of FIG. 1, FIG. 2 and FIG. 3, the overall perimeter of the peripheral wall 110 at the upper end 155 is such that all the rigid portions 175 can be laid flat simultaneously, the corrugated portions 165 stretching to accommodate the increased distance between the rigid portions 175 at the upper end 155 and in turn laying flat against the floor. In the present example shown, the peripheral wall 110 is approximately less than 3" long from outer periphery 120 to upper end 155, and more particularly approximately 2¾" long (i.e. within a reasonable tolerance), and even more particularly exactly 2¾" long. Each fold 170 is greater than 0.8" deep and more particularly approximately 1" deep at the upper end 155, that is to say that the depth from pinnacle peak to a baseline defined between the two adjacent groove peaks is 1" deep. In one particular example each fold is 1" deep. In the example shown the peripheral wall has a thickness of less than 0.05" and more particularly less than 0.04", and more particularly is made of a sheet of polyvinyl chloride that is 0.04" prior to a thermoforming process. In one example the peripheral wall so formed has a thickness of approximately 0.0375".

In order to allow flattening of the rigid portions 175 and the corrugated portions 165, the junction of the peripheral wall 110 and the base 105 at the outer periphery 120 may form a hinge which itself may be resilient such that the peripheral wall 110 returns to an upright position when no pressure is holding it down. In the present example, the resilience of the folds and/or the hinge is provided by the characteristics of the materials from which they are made.

The liquid containing device 100 may be made using a variety of materials and processes. In the present example, the liquid containing device 100 is entirely made by thermoforming process whereby a sheet of polyvinyl chloride (PVC) is heated and formed on a female cast using air suction. A sheet of 0.04" may be used, which is then stretched by the heat and by the form of the cast resulting in a varying thickness across the liquid containing device 100 that is generally around, and generally less than 0.04". Thermoforming has the advantage of allowing a thin design which permits good flexibility and being comparably inexpensive to implement. Other processes that have been considered include injection molding, however it is difficult to obtain large thin surfaces using molding and the cost of molds are very high.

PVC was selected for its flexibility, transparence and price. Other materials that have been considered include acrylonitrile butadiene styrene (ABS), which is flexible but rips easily and isn't transparent. Polystyrene (PS) is transparent but rips easily and cracks under pressure. Polypropylene (PP) was considered too soft for the desired dimensions although it is partially transparent. The same was true of high-density polyethylene (HDPE) and plyethylene (PE). The invention may be implementable using these materials by adapting the dimensions (e.g. thickness, depth of folds, height of wall) of the liquid containment device 100.

Once thermoformed, the liquid containment device 100 naturally retains its shape. PVC provides good elasticity and deformability with excellent shape memory such that the hinge at the outer periphery 120 and the folds 170 naturally regain their form whereby the peripheral wall has an upwards extending configuration.

The presence of liquid within the interior volume 115 causes outward pressure on the peripheral wall 110. However, the presence of the liquid reservoir 900 within the interior volume 115 lessens the overall volume of water within the interior volume 115 and thus reduces the pressure pressing outwards onto the peripheral wall 110 such that the peripheral wall 110 is in no danger of flattening under the pressure of liquid contained within it, particularly water with the dimensions provided herein.

It is not necessary for the entire peripheral wall 110 to be folded down to install the liquid containment device 100 under the liquid reservoir 900. At least one side of the peripheral wall 110 can be folded down such that the liquid containment device 100 may be slid, folded-side-first under the liquid reservoir 900. If the at least one side that is folded down is as wide as the a width of the liquid reservoir 900 (particularly in the direction transversal to the sliding of the liquid containment device 100), then the liquid containment device 100 should be able to slide all the way through until the folded-down at least one side emerges on the other side of the liquid reservoir 900. For example in the example of FIG. 1, only the rigid portions 176 need to be flattened to slide the liquid containment device 100 under the liquid reservoir 900, although other sides may be flattened too.

FIG. 4 shows a cross-sectional view of the liquid reservoir 900 during an operation inserting the liquid containment device 100 underneath it. A gap 905 is provided between the liquid reservoir 900 and the floor 910. This gap 905 has a thickness that is greater than the thickness of the liquid containment device 100, and more particularly than the thickness of the base 105 and a flattened portion of the liquid containment device 100 (in this case the flattened portion is the at least one side 190 which comprises rigid portions 176). Advantageously, thanks to the flattenable nature of the peripheral wall 110, the gap 905 does not need to be as high as the height of the peripheral wall 110. The gap 905 may be provided by lifting an already-installed reservoir using any appropriate means, for example using a two-part tool as taught in U.S. Pat. No. 9,090,440 including jack 915 and wedge (not shown).

The liquid containment device is placed on the floor 910 near the liquid reservoir 900, and more particularly the base 105 is placed on the floor with the at least one side 190 of the peripheral wall 110 that will be folded down facing a first side 920 of the liquid reservoir 900. In particular, the liquid containment device 100 should be placed where possible with respect to the jack 915 and other surrounding obstacles around the liquid reservoir 900. In the example shown here, the first side is opposite the jack 915, although the liquid containment device 100 could also be slid from a side next to the side of the jack 915 since the jack 915 has a base 925 that is apart from the liquid reservoir 900 such that an upright portion of the peripheral wall 110 could slide between the liquid reservoir 900 and the base 925 of the jack 915.

The at least one side 190 of the peripheral wall 110 that is to be flattened is flattened against the floor 910 prior to sliding the liquid containment device 100 under the reservoir 900. Flattening the at least one side 190 can be done by manual force, e.g. by hand, by holding down the at least one side against the floor 910. Tools may also be used in that endeavor such as a rod or a flat board to hold it down. Alternatively, the at least one side 190 may be held in a flattened formed whereby it is generally co-planar with the base e.g. by a sleeve or by a clip that can be removed or broken off by a user once in place under the liquid reservoir 900.

The at least one side 190 is held flattened, and more generally held down to a height smaller than the thickness of the gap 905. While the at least one side 190 is flattened, the liquid containment device 100 is slid under the liquid reservoir 900 in the gap 905 from the first side 920 until the at least one side 190 emerges at a second side 930, opposite the first side 920 (that is to say across in the direction of travel of the liquid containment device 100) whereupon the at least one side 190 is allowed to return to projecting upwards from the base 105. More specifically, the at least one side 190 may be held flattened as it is slid until it is underneath the liquid reservoir 900, whereupon even if not held flattened it cannot return upright because of the liquid reservoir 900. If the liquid reservoir 900 has a smooth enough underside to prevent the at least one side 190 from catching, the liquid containment device 100 may be slid without holding down the at least one side 190 once it is under the liquid reservoir 900. The at least one side may be allowed to return to projecting upwards from the base by releasing it while it is still underneath the liquid reservoir 900. Once the at least one side 190 passes through the liquid reservoir 900 and emerges at another end, it will return to projecting upwards and the peripheral wall will return to its contracted configuration by its own resilience. This is shown in FIG. 5, where the liquid containment device 100 has been positioned underneath the liquid reservoir 900 and the liquid reservoir 900 has been lowered back onto the liquid containment device 100.

The jack 915 can then be removed by sliding it outward away from the liquid reservoir 900. Advantageously, the foldability of the peripheral wall 110 may also allow the jack 915 to be removed by forcing it past the at least one portion 190 (or another flattenable portion of the peripheral wall 110). The peripheral wall may yield and flatten under pressure from the jack 915 and thus allow its removal.

In this example, the peripheral wall 110 was pivoted about the hinge away from the base 105 to flatten in a generally co-planar but spaced-apart relationship with the base 105. However, the same flexibility which allows the peripheral wall 110 from pivoting in that direction may allow the peripheral wall 110 to pivot towards the base 105 for being flattened on top of the base. This may be useful, for example, in an installation of a new liquid reservoir, e.g. hot water tank, where the hot water tank can readily be moved around by the technician installing it. In this example, the hot water tank can be leaned onto an edge of its base and rolled over the liquid containment device 100, the peripheral wall 110 giving way under the weight of the tank. The tank than needs only be rolled a little bit further (e.g. pressing a far wall down away from the base 105) so that the portion of the peripheral wall 110 that is pressed down against the base 105 may be released and return to the upright position. The tank can then be edged into position, e.g. using the guiding ridges 135.

Thus as described herein, the peripheral wall is flexible and can be folded to flatten it but has a mechanical bias causing the resilient flexible folds to return to a folded position wherein the at least one portion 190 of the peripheral wall 110 returns to a contracted at-rest configuration wherein it extends upwardly from the base 105 and from the upper surface 125 of the base 105. The liquid containment device 100 can be said to be "spring loaded" in that it returns to its original configuration with the peripheral wall 110 extending upwardly like a spring.

In the above example, only one jack was used. This may be, for example, when the liquid reservoir 900 is near a wall and can be braced thereon using a wedge component. In alternate examples, e.g. where the liquid reservoir 900 is not near a wall, two (or possibly more) jacks may be used to lift the liquid reservoir 900 from respective sides that are not the side from which the liquid containment device 100 will be slid.

The liquid containment device 100 may comprise a mechanism for coping with accumulation of liquid within the interior volume 120. In particular, the liquid containment device may comprise a system for evacuating liquid captured within the interior volume outwards towards a drain. In one particular example, the liquid containment device 100 may comprise a conduit allowing the passage of a liquid from the interior volume across the peripheral wall to an exterior of the liquid containment device 100.

To this end, the liquid containment device 100 shown in FIG. 1 and FIG. 2 is provided with a plurality of drain conduits 200, which in this example are openable drain conduits. The drain conduits 200 provide a liquid communication passage from the interior volume 120 through the peripheral wall 110 to the exterior of the liquid containment device 100. However, the openable drain conduits are sealed by a conduit cover 205, which in this example is a frangible conduit cover. Thus the drain conduits are by default sealed so as to not allow passage of liquid therein. In order to open a drain conduit, the frangible conduit cover 205 is broken off, for example by cutting it away with a blade. Other frangible seal-removal technologies can be used, for example a suitably sealing tape that can be peeled off could be used.

A drainage tube can be provided in the opened drain conduit 200 to provide a liquid communication from the interior volume 120 to a draining location. In particular, the drainage tube may be a flexible hose, that may form a drainage inlet at the end that is inserted within the drain conduit 200. The other end of the flexible hose may form a drainage outlet that is inserted, for example, in a floor drain at an altitude lower than the drainage inlet so as to allow gravity-assisted evacuation of liquids from within the interior volume 120 towards the floor drain. The drainage tube may be press-fitted in the drain conduit 200 or may be sealed using sealant or may be affixed using a fitting device adapted to the drain conduit 200.

In this example only one drain conduit 200 was opened. Indeed in many cases that only one drainage tube will be necessary however the presence of several drain conduits provides a choice of placement of the drainage tube. Additional drainage tubes could be used in the other drain conduits 200 if desired.

Figure 7:
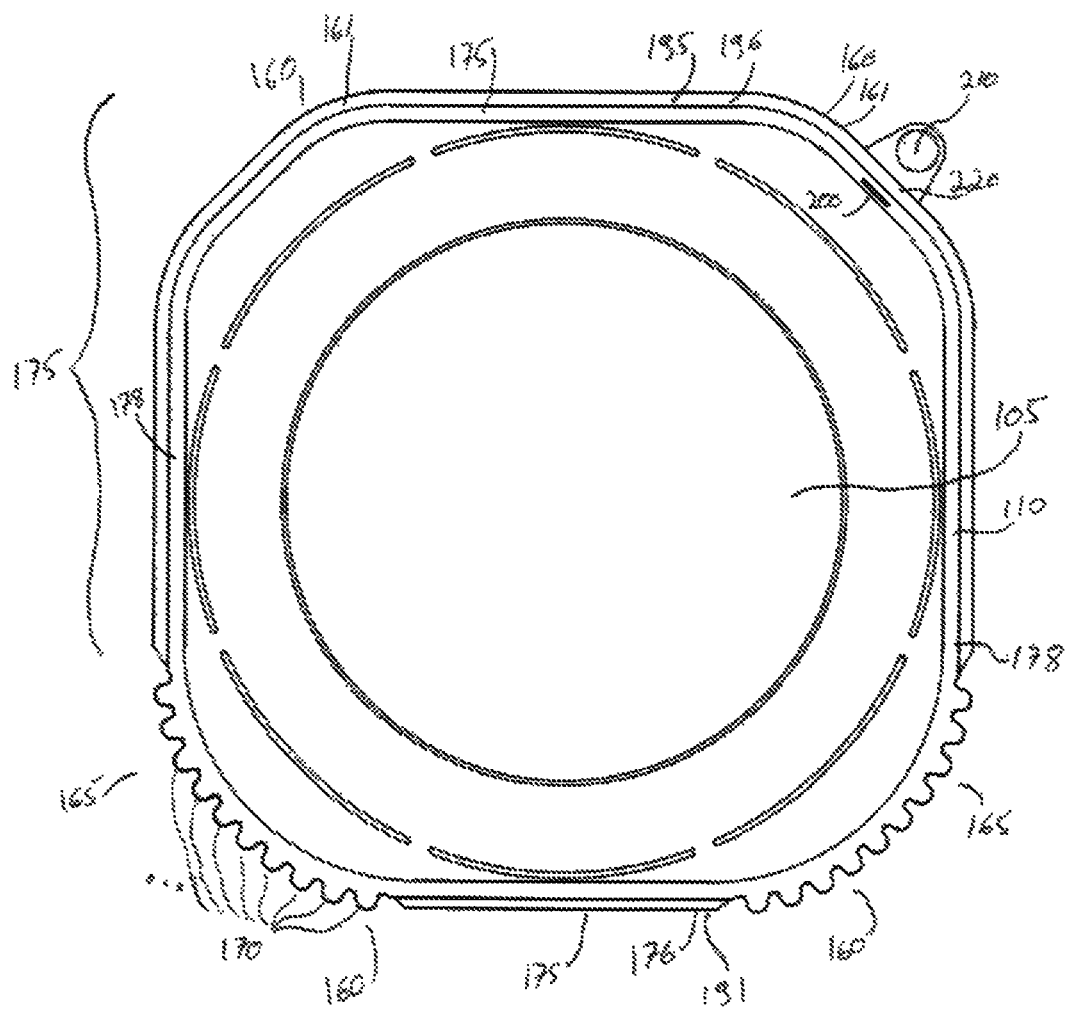
FIG. 7 shows a top plan view of a liquid containment device in a non-flattened configuration according to another non-limiting example.
Figure 8:
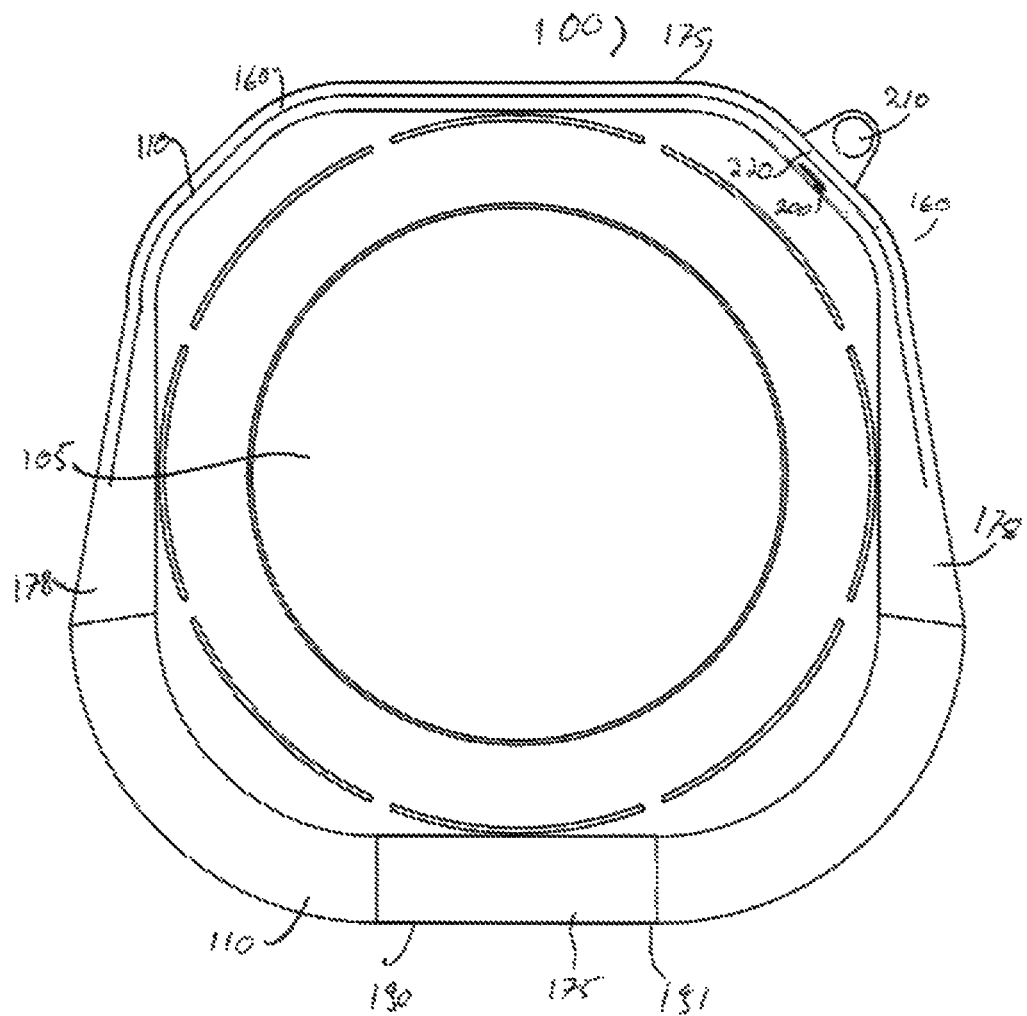
FIG. 8 shows a top plan view of the liquid containment device of FIG. 7 in a flattened configuration.

FIG. 7 and FIG. 8 illustrate a variant to the design of FIG. 1 wherein the liquid containment device 100 comprises several curved portions 160, only two of which have a corrugated portion 165. In this example the liquid containment device 100 comprises rigid curved portions 161, which do not comprise fold 175 allowing the flattening of a portion of the peripheral wall 110. The liquid containment device 100 of this example is intended for inserting from one side only, specifically from a foldable side 191 which comprise the at least one side 190 (in this case the only side) that can be folded down to be flattened. A flattenable rigid portion 176 extends between the two corrugated portions 165 in the foldable side 191. On the other side of the corrugated portions 175, a non-flattenable rigid portion 177 extends around a large part of the base 105.

The non-flattenable rigid portion 177 is reinforced by a rim 195 extending around the upper end 155 of the peripheral wall 110 at the non-flattenable rigid portion 177. The rim 195 comprises a flange 196 projecting transversally from the non-flattenable rigid portion 177, in this example in the direction outwardly from the interior volume 120. The flange 196 provides the peripheral wall 110 added rigidity in the non-flattenable rigid portion 177. This is particularly useful in the rigid curved portions 161 which may have a tendency to yield to folding pressures otherwise. Although the non-flattenable rigid portion 177 is not flattened down to the floor, it may yield and flex a little bit to accommodate flattening of the foldable side 191. In particular, lateral sides 178 of the non-flattenable rigid portion 177 may twist open a little bit as shown in FIG. 8 to allow the necessary deformation of the peripheral wall 110 to flatten the foldable side 191.

The variant of FIG. 7 and FIG. 8 also comprises a drain conduit 200. The drain conduit 200 comprises an aperture and is openable in that it can be sealed or unsealed with a provided plug 210. The plug 210 is provided on a hinged extension 215 that is connected to the peripheral wall 110 at the upper end 155 above the aperture. Conveniently, the extension 215 may be created with excess material that must be otherwise cut away in the thermoforming process, thus requiring no additional material cost. The extension meets the peripheral wall at a hinge 220 about which it can be pivoted to lower the plug 210 into the aperture to block the aperture. As with the hinge at the bottom of the peripheral wall 110, the hinge 220 is in fact made of the same material as the peripheral wall and is merely a portion thereof about which the material may bend or pivot. The extension 215 is dimensioned such that the plug can be inserted into the aperture of the drain conduit 200 when the extension 215 is pivoted downward towards the aperture. And more particularly, the plug 210 is positioned on the extension 215 at a distance from the hinge 220 that corresponds to the distance of the aperture down the peripheral wall 110 from the hinge 220. The plug 210 and extension 215 can be provided for pivoting inwardly towards the aperture through the interior volume 120 or outwardly on the other side of the peripheral wall 110. The plug 210 may be unplugged for, e.g., inserting a drainage tube into the drain conduit 200 as described above. The extension may also be biased for extending downward with the plug closing the drain conduit 200 in which case the presence of a drainage tube in the drain conduit 200 may simply hold the plug 210 out of the way of the drain conduit, particularly if the extension 215 pivots outwardly. Alternatively, the extension 215 may not be biased in closed position and may be held in closed position when closed by friction fit of the plug 210 in the aperture.

In yet another non-limiting example, the drain conduit 200 may be provided as an open aperture into which a plug, like plug 210 is provided by default. In this example, the plug may not be located on an extension but may simply be a separate piece. The plug may be provided pre-fitted to the drain conduit 200 or separately to be selectively installed by a user or omitted if a drainage tube is to be installed. The plug is fitted to seal the drain conduit 200 when installed. The plug may be installed from either side of the peripheral wall, however in one example the plug is pre-fitted in a sealing configuration from the inside of the peripheral wall such that any water pressure formed by contained liquid serves to further push the plug into the drainage conduit 200 to more solidly seal the plug.

In the above description, examples have been provided where leakage containment is provided to a liquid reservoir by means of the liquid containment device 100. However, the liquid containment device may also be used to contain leakage from other pieces of equipment such as washing machines, dishwashers or the like. To this end, the dimensions of the liquid containment device 100 can be adapted, for example to provide a base 105 that is large enough to receive a bottom portion of a washing machine.

Although various embodiments have been illustrated, this was for the purpose of describing, but not limiting, the present invention. Various possible modifications and different configurations will become apparent to those skilled in the art and are within the scope of the present invention, which is defined more particularly by the attached claims.

What is claimed is:

1. A liquid containment device capturing leakage from a piece of equipment, the liquid containment device being at least partly flatennable and slideable under said piece of equipment and comprising:
   a. a base defining a continuous upper surface for supporting said piece of equipment and a lower surface for facing a floor, said base having an outer periphery having at least one portion that is arcuate or curved about a middle of said upper surface, and
   b. a mechanically biased foldable peripheral wall, including at least one side, extending at rest upwardly above said upper surface towards an upper end from said base at said outer periphery and surrounding said base about said outer periphery to define an interior volume, said peripheral wall comprising at least one corrugated portion corresponding to said at least one curved portion of said base, each of said at least one corrugated portion comprising a plurality of tapered resilient flexible folds widening from said outer periphery towards said upper end to be unfoldable to expand the curved portion to allow the flattening of said at least one side such that said liquid containment device can be slid through a gap between said piece of equipment and said floor, the plurality of tapered flexible folds having a resilience creating a mechanical bias causing said resilient flexible folds to return to a folded position wherein said at least one side extends upwardly when said at least one side is slid past said piece of equipment.

2. The liquid containment device of claim 1, wherein said peripheral wall comprises at least one rigid portion, said at least one side comprising one of said at least one rigid portion.

3. The liquid containment device of claim 2, wherein at least one of said at least one rigid portions comprises a rigidity ridge conferring rigidity against deformation.

4. The liquid containment device of claim 2, wherein said at least one rigid portion comprises a flattenable rigid portion that is in said at least one side and that has a width that is wider than a width of said equipment, and wherein said peripheral wall comprises two of said at least one corrugated portions including one at each end of said flattenable rigid portion.

5. The liquid containment device of claim 1, wherein the peripheral wall comprises a drain conduit allowing the passage of a liquid from the interior volume across said peripheral wall to an exterior of the liquid containment device.

6. The liquid containment device of claim 5, wherein said drain conduit is an openable drain conduit comprising a frangible conduit cover that can be broken off to create an aperture in said peripheral wall.

7. The liquid containment device of claim 5, wherein said drain conduit is an openable drain conduit comprising an aperture in said peripheral wall and wherein said liquid containment device further comprises a plug for plugging said aperture.

8. The liquid containment device of claim 1, wherein said liquid containment device is composed of polyvinyl chloride thermoformed to shape.

9. The liquid containment device of claim 8, wherein said liquid containment device has a thickness of 0.040" or less.

10. The liquid containment device of claim 1, wherein said peripheral wall comprises a flatennable portion comprising said at least one side and a non-flatennable portion, said non-flatennable portion having at said upper end a flange projecting in a direction transversal from said non-flatennable portion to provide rigidity thereto.

11. A method for providing leakage containment for a piece of equipment comprising:
   a. providing a liquid containment device having a base dimensioned to receive a lower end of said piece of equipment and a mechanically biased foldable peripheral wall surrounding said base and projecting upwards therefrom, wherein said base comprises at least one curved peripheral portion that is arcuate or curved about a middle of said base for surrounding at least part of said equipment, said peripheral wall comprising at least one expandable portion expandable to allow the flattening of at least one side of said peripheral wall but resiliently biased in a upward extending configuration whereby said at least one side projects upwards at rest from said base;
   b. providing a gap between said piece of equipment and a floor beneath said equipment, said gap being thicker than both a thickness of said base and a thickness of said at least one side;
   c. placing said base on said floor with said at least one side facing a first side said piece of equipment and flattening said at least one side against said floor;
   d. while said at least one side is flattened against said floor, sliding said liquid containment device in the direction of said at least one side through said gap until said at least one side emerges on a second side of said piece of equipment opposite said first side and allowing said at least one side to return to projecting upwards from said base.

12. The method of claim 11, wherein said gap is thinner than a height of said at least one side when at rest and wherein said flattening said at least one side comprises holding said at least one side below said gap until it is slid underneath said piece of equipment and wherein allowing said at least one side to return to projecting upwards from said base comprises releasing said at least one side while it is underneath said piece of equipment such that it may return to projecting upwards to its height once it is slid past the equipment.

13. The method of claim 11, wherein providing a gap between said piece of equipment and said floor comprises lifting said piece of equipment above said floor.

14. The method of claim 13, wherein lifting said piece of equipment comprises inserting a lifting jack from a side of said piece of equipment other than said first side.

15. The method of claim 14, wherein lifting said piece of equipment comprises inserting two lifting jacks from on respective sides of said piece of equipment that are not said first side.

16. The method of claim 11, wherein said liquid containment device defines an interior volume, the method further comprising providing a drainage tube providing liquid communication from said interior volume to a drainage outlet.

17. The method of claim 16, wherein said peripheral wall comprises an aperture and wherein providing a drainage tube comprises inserting a first end of said tube in said aperture, said drainage outlet being located at a second end of said tube.

18. The method of claim 11, wherein said flattening said at least one side against said floor comprises pivoting said at least one side away from said base.

\* \* \* \* \*